United States Patent
Smith et al.

(10) Patent No.: US 8,575,772 B2
(45) Date of Patent: Nov. 5, 2013

(54) PERMANENT MAGNET MACHINE CONTROL SYSTEM

(75) Inventors: David Smith, Daleville, VA (US); Anthony Michael Klodowski, Hardy, VA (US)

(73) Assignee: General Electric Company, Schenectady, NY (US)

( * ) Notice: Subject to any disclaimer, the term of this patent is extended or adjusted under 35 U.S.C. 154(b) by 160 days.

(21) Appl. No.: 13/222,397

(22) Filed: Aug. 31, 2011

(65) Prior Publication Data
US 2013/0049363 A1   Feb. 28, 2013

(51) Int. Cl.
*F03D 9/00* (2006.01)

(52) U.S. Cl.
USPC ............................................. 290/44; 290/55

(58) Field of Classification Search
USPC ...................................... 290/44, 55
See application file for complete search history.

(56) References Cited

U.S. PATENT DOCUMENTS

| | | | |
|---|---|---|---|
| 4,920,306 A | 4/1990 | Mard et al. | |
| 6,288,515 B1 * | 9/2001 | Hiti et al. | 318/722 |
| 6,304,052 B1 * | 10/2001 | O'Meara et al. | 318/700 |
| 6,504,329 B2 * | 1/2003 | Stancu et al. | 318/400.23 |

* cited by examiner

*Primary Examiner* — Tho D Ta
(74) *Attorney, Agent, or Firm* — Cantor Colburn LLP

(57) ABSTRACT

A permanent magnet (PM) machine system is provided having a PM machine and a controller in communication with the PM machine. The PM machine has a q-axis voltage feedback signal and a pullout torque that represents a peak torque that the PM machine generates. The controller includes a q-axis current regulator that produces a commanded q-axis voltage that is supplied to the PM machine. The controller also includes at least one control logic for monitoring the q-axis voltage feedback signal of the PM machine.

20 Claims, 4 Drawing Sheets

US 8,575,772 B2

PERMANENT MAGNET MACHINE CONTROL SYSTEM

BACKGROUND OF THE INVENTION

The subject matter disclosed herein relates to a permanent magnet (PM) machine system, and more specifically to a PM machine system that controls a PM machine such that the PM machine does not substantially exceed a pullout torque value.

Wind turbines are one alternative to conventional sources of energy. The blades and hub of the wind turbine are referred to as a wind turbine rotor. The wind turbine rotor is typically connected to a permanent magnet (PM) generator through a gearbox. A wind turbine rotor that is rotating at very high speeds tends to obstruct wind flow, which in turn reduces power extraction of the wind turbine. For example, a strong gust of wind can potentially cause the wind turbine rotor to rotate at excessive speeds. The PM generator may be used to control the speed of the wind turbine rotor. Specifically, torque may be exerted by the PM generator to control the speed of the wind turbine rotor.

A PM generator typically includes a stator and a rotor, where the stator may include a three phase stator winding that forms a cylindrical cavity. The rotor of the PM generator rotates within the stator cavity by providing three phase electrical voltages to the stator windings. The stator voltages generate stator currents that create a rotating stator field. The stator field corresponds to a stator magnetomotive force (stator mmf). The torque produced by a PM generator is proportional to the sine of an angle located between the rotor angular position and the stator mmf. Specifically, the peak torque produced by the PM generator is typically referred to as pullout torque. If an attempt is made to increase the torque value past the pullout torque value by increasing the current, then less torque will actually be produced. This condition is commonly referred to as motor pullout and refers to a point where a machine operates past the pullout torque value.

The torque of the PM generator is also proportional to the magnitude of the stator flux. However, when connected to a power converter, the stator flux of the PM generator is limited by the peak converter output voltage. As the speed and frequency of the PM generator increases, the stator flux decreases. This may create an issue in the event that a strong gust of wind causes the wind turbine rotor to rotate at very high speeds. This is because as the wind turbine rotor approaches an over speed condition, a reduction in flux in the PM generator is needed to generate the torque required to control the speed of the wind turbine rotor. However, as the wind turbine rotor approaches the over speed condition, the speed and frequency of the PM generator are increased, therefore reducing the stator flux. Thus, the ability to exert torque by the PM generator to control the speed of the wind turbine rotor is diminished.

BRIEF DESCRIPTION OF THE INVENTION

According to one aspect of the invention, a permanent magnet (PM) machine system is provided having a PM machine and a controller in communication with the PM machine. The PM machine has a q-axis voltage feedback signal and a pullout torque that represents a peak torque that the PM machine generates. The controller includes a q-axis current regulator that produces a commanded q-axis voltage that is supplied to the PM machine. The controller also includes at least one control logic for monitoring the q-axis voltage feedback signal of the PM machine. The controller includes at least one control logic for calculating a torque producing current limit. The torque producing current limit represents the peak torque producing current the PM machine operates at before surpassing the pullout torque value. The torque producing current limit is based on at least the q-axis voltage feedback signal. The controller includes at least one control logic for limiting a q-axis current command sent to the q-axis current regulator such that the q-axis current command does not substantially exceed the torque producing current limit.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
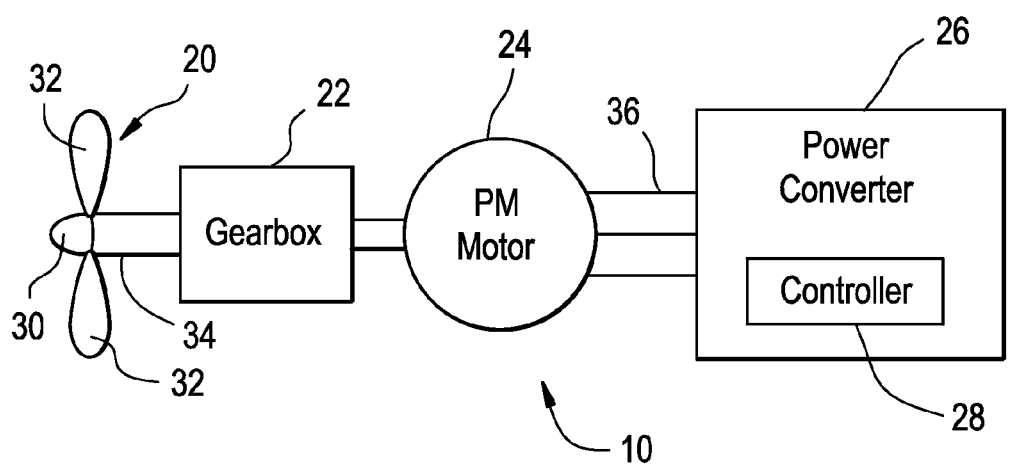
FIG. 1 is a schematic illustration of an exemplary wind power plant.

Referring now to FIG. 1, an exemplary wind power plant 10 is illustrated. The wind power plant 10 includes a wind turbine 20, a gearbox 22, a permanent magnet (PM) machine 24, a power convertor 26, and a motor controller 28. The wind turbine 20 includes a hub 30 and a plurality of rotor blades 32 that are connected to the hub 30. A shaft 34 transfers energy from the wind turbine 20 to the PM machine 24 through the gearbox 22. The rotational speed of the shaft 34 is dependent on wind speed. The PM machine 24 is typically any type of machine that converts the mechanical energy from the shaft 34 into electrical energy such as, for example, a generator. A set of three terminals 36 of the PM machine 24 are connected to the power converter 26. The power convertor 26 generally includes circuitry for converting the variable frequency AC voltage from the PM machine 24 into a DC voltage. The power converter 26 includes a power bridge (not shown) and the motor controller 28. The power bridge may include various power switching devices such as, for example, insulated gate bipolar transistors (IGBTs) or integrated gate-commutated thyristors (IGCTs). Although FIG. 1 illustrates a wind power plant 10, it is to be understood that the PM machine 24 and the power convertor 26 may be used in other applications as well.

Figure 2:
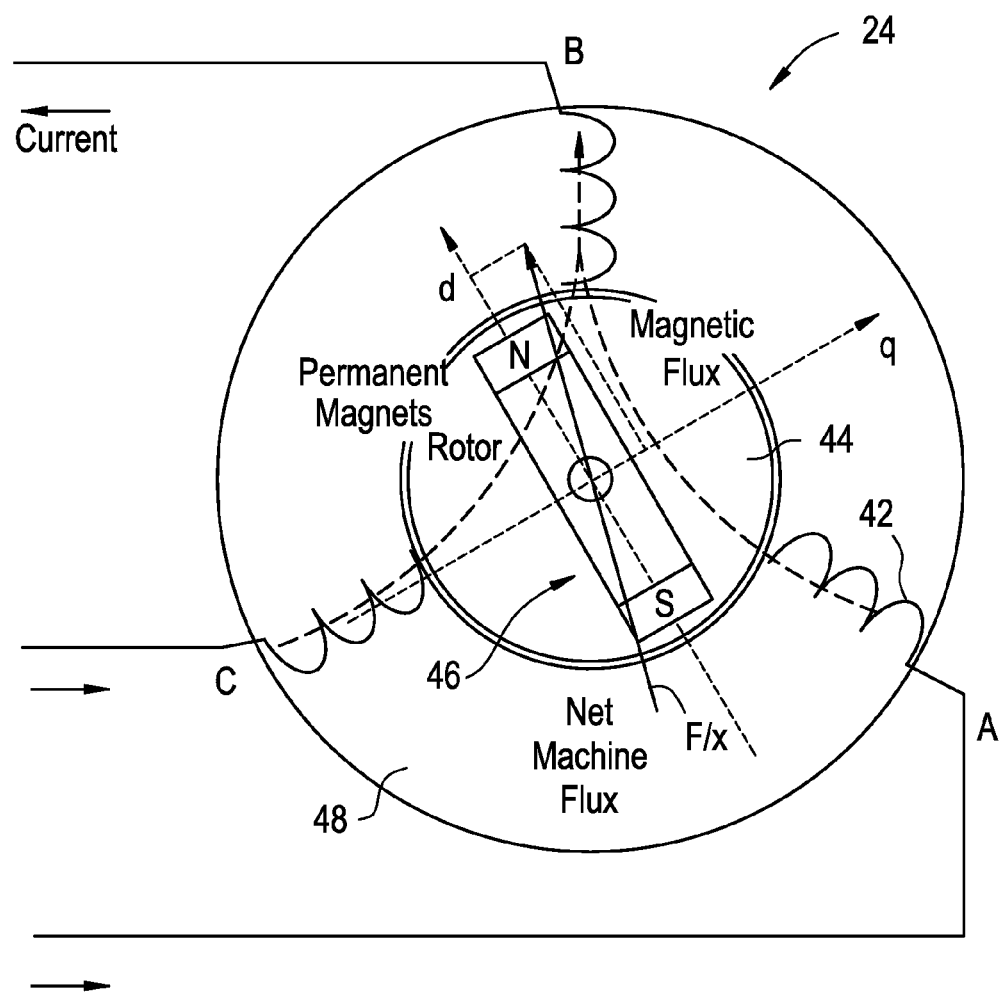
FIG. 2 is a schematic illustration of a permanent magnet (PM) machine that is illustrated in FIG. 1.

FIG. 2 is an illustration of the PM machine 24. The PM machine 24 includes three stator windings 42, a rotor 44 having at least one permanent magnet 46, and a stator 48. The PM machine 24 includes stator voltages and currents that are measured by the motor controller 28. The motor controller 28 resolves the stator voltages and currents into rotating reference frame values, which are designated as 'd' and 'q'. Specifically, FIG. 2 illustrates a d-axis and a q-axis of the PM machine 24, where the d-axis is aligned with the permanent magnet of the rotor of the PM machine 24, and the q-axis is in quadrature to the d-axis. The d-axis typically represents the flux producing current or voltage and the q-axis represents the torque producing flux or voltage. The motor controller 28 (shown in FIG. 1) generally employs a strategy to independently control the d-axis current id and the q-axis current iq. The controller 28 utilizes a plurality of feedback signals from the PM machine 24 to generate voltages and currents that drive the PM machine 24.

Figure 3:
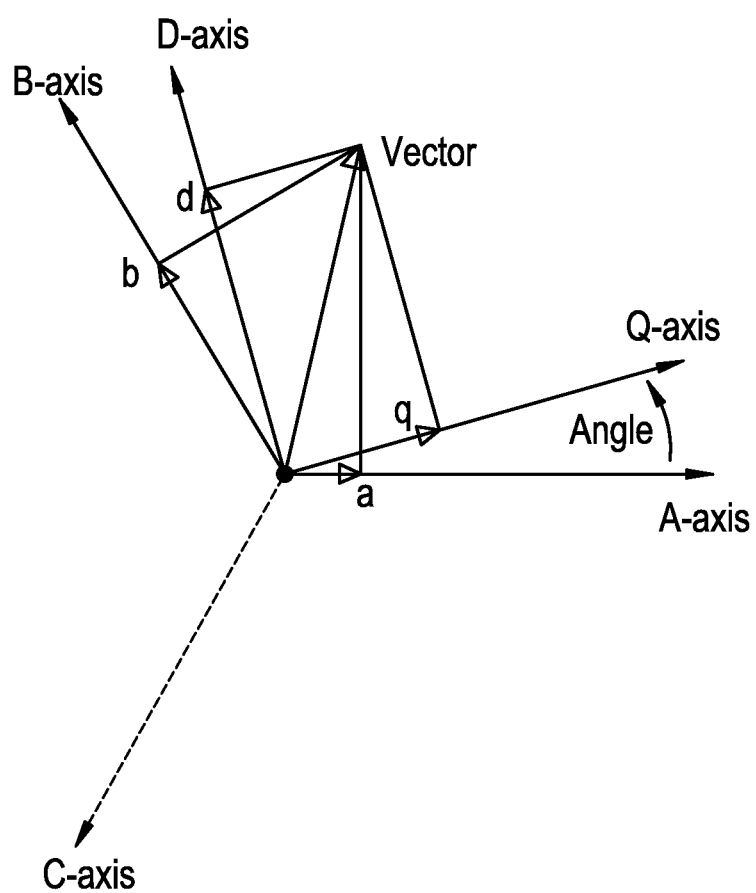
FIG. 3 is a schematic vector diagram of the of PM machine shown in FIG. 2.

FIG. 3 is a vector diagram for the PM machine 24 illustrated in FIG. 2. The diagram illustrates three stationary axes, A, B and C, as well as the q-axis and d-axis. Referring now to FIGS. 2-3, in the embodiment as shown the d-axis is aligned with the permanent magnet 46 of the rotor 44. When the PM machine 24 is at about zero torque and current, a net machine flux Flx is aligned with the d-axis and is equal to the flux produced by the permanent magnet 46. The net machine flux Flx of the PM machine 24 is controlled by controlling the current in the PM machine 24, and is controllable to produce a specified set of operating parameters. The torque produced by the PM machine 24 is also controlled by controlling the current in the PM machine 24. The net flux and torque are independently controlled to desired values by controlling the d and q-axis currents. In the exemplary embodiment as shown, the d and q-axis currents each affect both flux and torque, except when the q-axis current is about zero. Other control techniques, commonly referred to as field oriented control, employ a reference frame that seeks to decouple the control of flux and torque. Specifically, the q-axis current iq is applied to the stator windings 42 to create both an initial torque and a q-axis flux Flxq. The q-axis flux Flxq is equal to the product of the q-axis current iq multiplied by a machine inductance of the q-axis Lq. The net machine flux Flx is calculated by squaring a net flux of the d-axis Flxd and the net flux of the q-axis Flxq, adding the both together, and taking the square root of the sum. The net flux of the d-axis Flxd is equal to the sum of a permanent magnet flux Flx_pmd, and the product of a machine inductance of the d-axis Ld and the d-axis current id.

If the d-axis current id is kept constant, the net machine flux Flx increases as the torque of the PM machine 24 increases. The machine voltage of the PM machine 24 is the product of the net machine flux Flx multiplied by a rotational frequency W of the PM machine 24. At some specified combination of frequency W and torque of the PM machine 24, the machine voltage exceeds a specified limit of either the PM machine 24 or the power converter 26 (shown in FIG. 1), thus the net flux of the d-axis Flxd should be decreased.

To reduce the amount of the net flux of the d-axis Flxd, a d-axis current of a polarity to oppose the permanent magnet flux Flx_pmd of the PM machine 24 is applied. The pullout torque of the PM machine 24 represents the peak torque that the PM machine 24 is capable of generating with a specified net value of flux. This operating point is characterized by the d-axis flux Flxd being reduced to about zero and the net machine flux Flx being on the q-axis of the PM machine 24. If an attempt is made to increase the torque of the PM machine 24 past the pullout torque value, then less torque will actually be produced by the PM machine 24. It should be noted that the permanent magnet flux Flx_pmd, the machine inductance of the d-axis Ld, and the machine inductance of the q-axis Lq are not constant values, but vary depending on temperature and the level of current of the PM machine 24.

Figure 4:
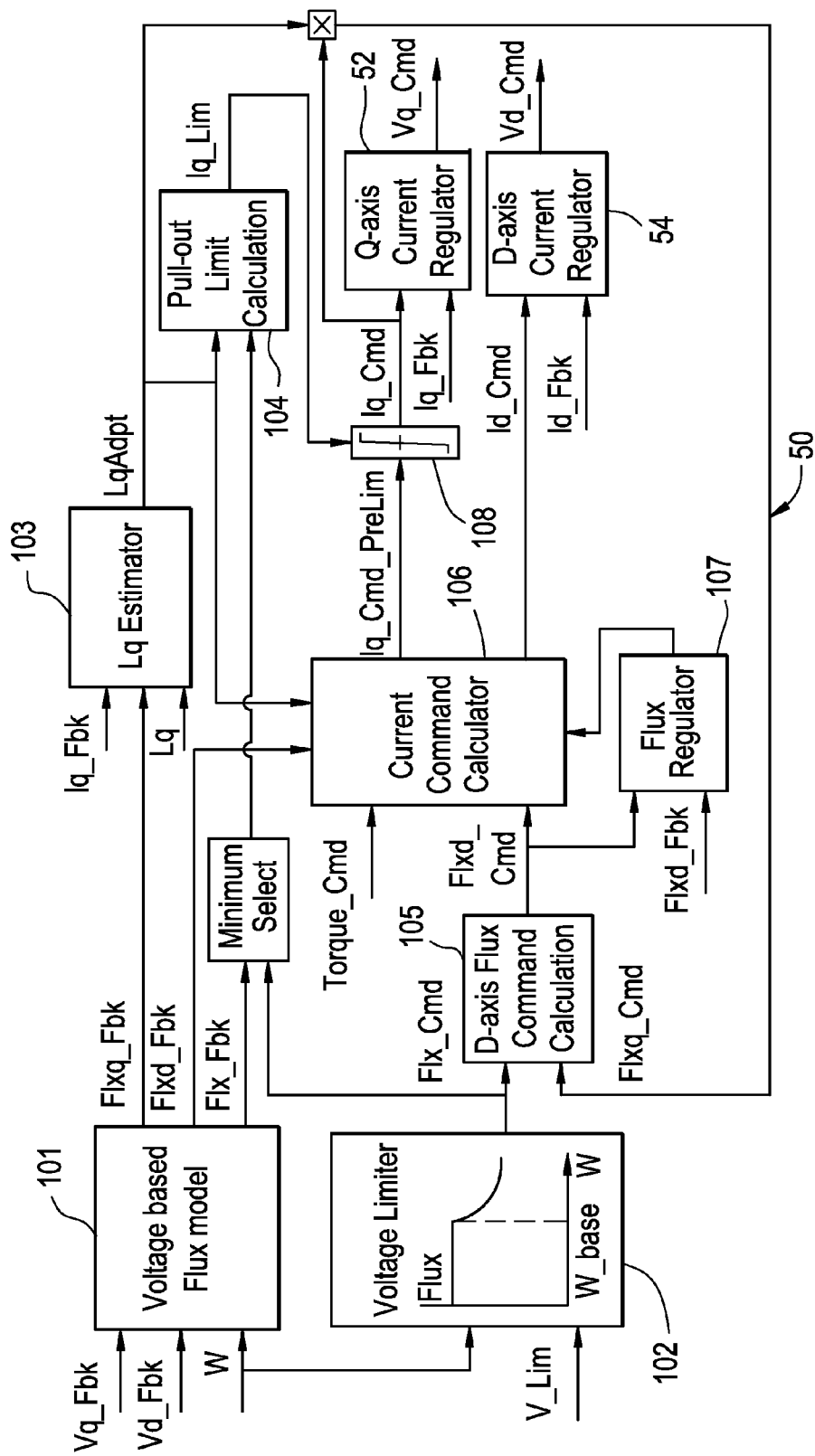
FIG. 4 is an exemplary motor control approach that is employed to control the PM machine illustrated in FIG. 2.

Turning now to FIG. 4, a motor control block diagram 50 is illustrated showing an exemplary motor control approach. The motor control model may be implemented by the motor controller 28 (shown in FIG. 1). In the approach as shown in FIG. 4, the current and torque of the PM machine 24 (shown in FIG. 2) is controlled by a set of current regulators 52 and 54. Specifically, in the embodiment as shown in FIG. 4, a q-axis current regulator 52 and a d-axis current regulator 54 are both shown. The current regulators 52, 54 generally produce a commanded voltage and supply the commanded voltage to the PM machine 24. That is, the q-axis current regulator 52 outputs a commanded q-axis voltage Vq_Cmd, and the d-axis current regulator 54 outputs a commanded d-axis voltage Vd_Cmd.

The motor control block diagram 50 receives a q-axis voltage feedback signal Vq_Fbk, a d-axis voltage feedback signal Vd_Fbk that is derived from a measured A, B, and C axes voltages (the A, B and C axes are shown in FIG. 2), and the frequency W that is derived from either an encoder or a voltage feedback based Phase-Locked Loop (not shown) from the PM machine 24. Specifically, a voltage based flux model 101 receives the q-axis voltage feedback signal Vq_Fbk, a d-axis voltage feedback signal Vd_Fbk, and the frequency W of the PM machine 24. The voltage based flux model 101 includes control logic for determining the machine fluxes based on the voltage feedback signals and the frequency W. That is, a q-axis flux feedback Flxq_Fbk is based on the q-axis voltage feedback signal Vq_Fbk, where the q-axis voltage feedback signal Vq_Fbk is the derivative of the q-axis flux feedback Flxq_Fbk. A d-axis flux feedback Flxd_Fbk is based on the d-axis voltage feedback signal Vd_fbk, where the d-axis voltage feedback Vd_fbk is the derivative of the d-axis flux feedback Flxd_Fbk. A net machine flux feedback Flx_Fbk is also calculated by the voltage based flux model 101 as well, where the net machine flux feedback is calculated by the following equation:

$$Flx\_Fbk = \sqrt{(Flxq\_Fbk^2 + Flxd\_Fbk^2)}$$

In the above equation, the net machine flux feedback Flx_Fbk is the square root of the q-axis flux feedback Flxq_Fbk squared and the d-axis flux feedback Flxd_Fbk squared.

A voltage limiter 102 is also provided. The voltage limiter 102 receives the frequency W and a voltage limit set point V_Lim, and calculates a net commanded flux magnitude Flx_Cmd. The voltage limit set point V_Lim is typically a predetermined value that is stored in the memory of the controller 28, and represents the peak voltage that can be applied to the PM machine 24. The net commanded flux magnitude Flx_Cmd is calculated by determining a nominal flux magnitude and the value of the voltage limit set point V_Lim divided by the frequency W, and selects the lesser of the two values as the net commanded flux magnitude Flx_Cmd. The graph illustrated within the voltage limiter 102 represents a curve of the voltage limit set point V_Lim divided by the frequency W, where a limit or clamp is applied to the curve.

A machine inductance of the q-axis estimator Lq Estimator 103 is provided for calculating an adapted q-axis inductance Lq_Adapt. The adapted q-axis inductance Lq_Adapt represents the actual value of the PM machine's 24 inductance as opposed to the nominal value, and typically varies with respect to current and temperature. Specifically, the q-axis estimator Lq Estimator 103 receives the q-axis flux feedback Flxq_Fbk from the voltage based flux model 101, a q-axis machine current feedback Iq_Fbk, and an adjusted value of q-axis machine impedance Lq. The adjusted value of the q-axis machine impedance Lq is a nominal value, and the q-axis machine current feedback Iq_Fbk is calculated by demodulating the machine currents into the q-axis reference frame. The q-axis estimator Lq Estimator 103 calculates the adapted q-axis inductance Lq_Adapt by dividing the q-axis flux feedback Flxq_Fbk by the q-axis machine current feedback Iq_Fbk. In the event that q-axis machine current feedback Iq_Fbk is at or approaches zero, then the q-axis estimator Lq Estimator 103 uses a nominal value of the adjusted value of q-axis machine impedance Lq as the adapted q-axis inductance Lq_Adapt.

A pullout limit calculator 104 is provided, and receives the adapted q-axis inductance Lq_Adapt from the q-axis estimator Lq Estimator 103. The pullout limit calculator value also receives either the net commanded flux magnitude Flx_Cmd from the voltage limiter 102, or the machine flux feedback Flx_Fbk from the voltage based flux model 101. Specifically, the minimum value of the net commanded flux magnitude Flx_Cmd and the net machine flux feedback Flx_Fbk is selected, and sent to the pullout limit calculator 104. The pullout limit calculator 104 then divides either the net commanded flux magnitude Flx_Cmd and the machine flux feedback Flx_Fbk, depending on which is selected, by the adapted q-axis inductance Lq_Adapt to calculate a q-axis current limit iq_Lim. The q-axis current iq_Lim represents the peak q-axis current iq that the PM machine 24 may operate at before surpassing the pullout torque value.

A d-axis flux command calculator 105 is provided, where the net commanded flux magnitude Flx_Cmd is received from the voltage limiter 102, and a q-axis commanded machine flux Flxq_Cmd is received. The q-axis commanded machine flux Flxq_Cmd is obtained by multiplying the adapted q-axis inductance Lq_Adapt by a q-axis current command iq_Cmd. Calculation of the q-axis current command iq_Cmd is discussed in greater detail below. A d-axis commanded machine flux Flxd_Cmd is calculated by the equation:

$$Flxd\_Cmd = \sqrt{(Flx\_Cmd^2 - Flxq\_Cmd^2)}$$

In the above equation, the d-axis commanded machine flux Flxd_Cmd is the square root of the net commanded flux magnitude Flx_Cmd squared less the q-axis commanded machine flux Flxq_Cmd squared.

A current command calculator 106 is employed to calculate a d-axis current command id_Cmd and a preliminary q-axis current command iq_Cmd_PreLim. A torque command set point value Torque_Cmd, the d-axis commanded machine flux Flxd_Cmd from the d-axis flux command calculator 105, the adapted q-axis inductance Lq_Adapt from the q-axis estimator Lq Estimator 103, and the d-axis flux feedback Flxd_Fbk from the voltage based flux model 106 are inputted into the current command calculator 106. The permanent magnet flux Flx_pmd, the machine inductance of the d-axis Ld, and a number of pole pairs of the PM machine 24 are stored on the memory of the controller 28 are also provided as well to the current command calculator 106. A flux regulator 107 is also provided as well and receives the d-axis flux feedback Flxd_Fbk and the d-axis flux command Flxd_Cmd from the d-axis flux command calculator 105. The flux regulator 107 is employed to adjust the values for the permanent magnet flux Flx_pmd and the machine inductance of the d-axis Ld accordingly in the calculation of the d-axis current command id_Cmd.

The current command calculator 106 includes control logic for receiving the amount of torque that is to be generated by the PM machine 24, and calculates the d-axis current command id_Cmd and the preliminary q-axis current command iq_Cmd_PreLim based on the amount of torque that is needed. Specifically, in one exemplary embodiment, the d-axis current command id_Cmd and the preliminary q-axis current command iq_Cmd_PreLim may be calculated by the following equations:

$$Torque\_Cmd = \text{\# of pole pairs of PM machine} * [id\_Cmd * Flxq\_Fbk - iq\_Cmd * Flxd\_Fbk]$$

$$Flxd\_Cmd = Flx\_pmd + id\_Cmd * Ld$$

two equations above have two unknowns, namely the d-axis current command id_Cmd and the preliminary q-axis current command iq_Cmd_PreLim. It should be noted that other approaches exist as well to calculate the d-axis current command id_Cmd and the preliminary q-axis current command iq_Cmd_PreLim.

The d-axis current regulator 54 receives the d-axis current command id_Cmd from the current command calculator 106 and a d-axis current machine current feedback id_Fbk, and outputs the commanded d-axis voltage Vd_Cmd. The preliminary q-axis current command iq_Cmd_PreLim from the current command calculator 106 is sent to a limiter 108. The limiter 108 also receives the q-axis current limit iq_Lim from the pullout limit calculator 104, where the q-axis current iq_Lim represents the peak q-axis current iq that the PM machine 24 may operate at before surpassing the pullout torque value. The limiter 108 compares the q-axis current command iq_Cmd_PreLim with the q-axis current limit iq_Lim to ensure that the current command sent to the q-axis current regulator 52 does not substantially exceed the pullout torque value. That is, the limiter 108 limits a commanded q-axis current command iq_Cmd to the q-axis current limit iq_Lim. The commanded q-axis current command iq_Cmd and a q-axis current machine current feedback iq_Fbk are both sent to the q-axis current regulator 52, where the q-axis regulator 52 outputs the commanded q-axis voltage Vq_Cmd.

The motor control approach described above and illustrated in FIGS. 1-4 will generally ensure that the PM machine 24 operates at or below the pullout torque. Specifically, the q-axis current iq is controlled such that the q-axis flux Flxq is equal to a specific proportion of the net machine flux Flx. Specifically, in one embodiment to allow for the most amount of torque without surpassing the operating point, the proportion between the q-axis flux Flxq and the net machine flux Flx is about 1. The motor control approach as described and shown in FIGS. 1-4 will generally allow for the PM machine 24 to be operated with the most amount torque possible without surpassing the pullout torque value even if the PM machine 24 is subjected to relatively weak flux values, for example due to high speed operation, as well as variations in machine parameters. Some of machine parameters include, for example, the permanent magnet flux Flx_pmd, the machine inductance of the d-axis Ld, and the machine inductance of the q-axis Lq, which vary depending on temperature and the level of current of the PM machine 24.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A permanent magnet (PM) machine system, comprising:
a PM machine having a q-axis voltage feedback signal and a pullout torque that represents a peak torque that the PM machine generates;
a controller in communication with the PM machine, the controller including:
at least one control logic for monitoring the q-axis voltage feedback signal of the PM machine to determine a machine flux;
at least one control logic for calculating a torque producing current limit based on at least the determined machine flux, the torque producing current limit representing the peak torque producing current the PM machine operates at before surpassing the pullout torque value;
at least one control logic for limiting a q-axis current command using the torque producing current limit such that the q-axis current command does not substantially exceed the torque producing current limit; and
a q-axis current regulator that receives the limited q-axis current command to produce a commanded q-axis voltage that is supplied to the PM machine.

2. The PM machine system of claim 1, wherein the PM machine includes a d-axis voltage feedback signal and the controller includes a d-axis current regulator that produces a commanded d-axis voltage that is supplied to the PM machine.

3. The PM machine system of claim 2, wherein the controller includes at least one control logic for monitoring the d-axis voltage feedback signal of the PM machine, and at least one control logic for calculating a preliminary q-axis current command and a d-axis current command, the preliminary q-axis current command based on at least the q-axis voltage feedback signal and the d-axis current command based on at least the d-axis voltage feedback signal, and wherein the controller includes at least one control logic for sending the d-axis current command to the d-axis current regulator.

4. The PM machine system of claim 3, wherein the controller includes at least one control logic for comparing the preliminary q-axis current command and the torque producing current limit to determine if the preliminary q-axis current command exceeds the torque producing current limit.

5. The PM machine system of claim 4, wherein the controller includes a voltage based flux model that receives the q-axis voltage feedback signal, the d-axis voltage feedback signal, and a frequency of the PM machine, and wherein the voltage based flux model includes control logic for determining a q-axis flux feedback, a d-axis flux feedback, and a net machine flux feedback.

6. The PM machine system of claim 5, wherein the controller includes a q-axis machine inductance estimator for calculating an adapted q-axis inductance, wherein the q-axis machine inductance estimator receives the q-axis flux feedback from the voltage based flux model, a q-axis machine current feedback, and an adjusted value of q-axis machine impedance.

7. The PM machine system of claim 6, wherein the controller includes a voltage limiter that receives the frequency and a voltage limit set point and calculates a net commanded flux magnitude, wherein the net commanded flux magnitude is calculated by determining a nominal flux magnitude and the voltage limit set point divided by the frequency, and selects the lesser of the two values as the net commanded flux magnitude.

8. The PM machine system of claim 7, wherein the controller includes at least one control logic for selecting a minimum value of the net commanded flux magnitude and the net machine flux feedback and sends the minimum value to a pullout limit calculator.

9. The PM machine system of claim 8, wherein the pullout limit calculator receives the adapted q-axis inductance from the q-axis machine inductance estimator, and wherein the pullout limit calculator divides one of the net commanded flux magnitude and the machine flux feedback by the adapted q-axis inductance to calculate the torque producing current limit.

10. The PM machine system of claim 9, wherein the controller includes a d-axis flux command calculator that receives the net commanded flux magnitude from the voltage limiter and a q-axis commanded machine flux, wherein the q-axis commanded machine flux is calculated by multiplying the adapted q-axis inductance by the q-axis current command.

11. The PM machine system of claim 10, wherein the d-axis flux command calculator calculates a d-axis commanded machine flux that is the square root of the net commanded flux magnitude squared less the q-axis commanded machine flux squared.

12. The PM machine system of claim 11, wherein the controller includes a current command calculator to calculate the d-axis current command and the preliminary q-axis current command, wherein a torque command set point value, the d-axis commanded machine flux from the d-axis flux command calculator, the adapted q-axis inductance from the q-axis estimator, and the d-axis flux feedback from the voltage based flux model are inputted into the current command calculator.

13. The PM machine system of claim 12, wherein the controller includes a flux regulator that receives the d-axis flux feedback and the d-axis commanded machine flux from the d-axis flux command calculator, and wherein the flux regulator compensates for adjustment of a permanent magnet flux and a machine inductance of the d-axis in the calculation of the d-axis current command.

14. The PM machine system of claim 1, wherein the controller includes at least one control logic for monitoring a q-axis machine current feedback and a d-axis machine current feedback of the PM machine.

15. The PM machine system of claim 14, wherein a d-axis current regulator receives the d-axis current machine current feedback, and the q-axis current regulator receives the q-axis current machine current feedback.

16. The PM machine system of claim 1, wherein the PM machine is connected to a power converter, and wherein the controller is included with the power converter.

17. The PM machine system of claim 16, further comprising a wind turbine, a shaft, and a gearbox, wherein the shaft transfers energy from the wind turbine to the PM machine through the gearbox.

18. A wind power plant, comprising:
a wind turbine;
a gearbox connected to the wind turbine through a shaft;
a power convertor;
a permanent magnet (PM) machine connected to the power converter, the shaft transferring energy from the wind turbine to the PM machine through the gearbox, the PM machine having a q-axis voltage feedback signal, a d-axis voltage feedback signal, and a pullout torque that represents a peak torque that the PM machine generates;
a controller in communication with the PM machine and the power converter, the controller included with the power converter, the controller including:

a q-axis current regulator that produces a commanded q-axis voltage that is supplied to the PM machine;

a d-axis current regulator that produces a commanded d-axis voltage that is supplied to the PM machine;

a voltage based flux model that receives the q-axis voltage feedback signal, the d-axis voltage feedback signal, and a frequency of the PM machine, and wherein the voltage based flux model includes control logic for determining a q-axis flux feedback and a d-axis flux feedback;

a q-axis machine inductance estimator for calculating an adapted q-axis inductance, wherein the q-axis machine inductance estimator receives the q-axis flux feedback from the voltage based flux model, a q-axis machine current feedback, and an adjusted value of q-axis machine impedance;

a voltage limiter that receives the frequency and a voltage limit set point and calculates a net commanded flux magnitude, wherein the net commanded flux magnitude is calculated by determining a nominal flux magnitude and the voltage limit set point divided by the frequency, and selects the lesser of the two values as the net commanded flux magnitude;

at least one control logic for monitoring the q-axis voltage feedback signal and the d-axis voltage feedback signal of the PM machine;

at least one control logic for calculating a torque producing current limit, the torque producing current limit representing the peak torque producing current the PM machine operates at before surpassing the pullout torque value, wherein the torque producing current limit is based on at least the q-axis voltage feedback signal;

at least one control logic for calculating a preliminary q-axis current command and a d-axis current command, the preliminary q-axis current command based on at least the q-axis voltage feedback signal and the d-axis current command based on at least the d-axis voltage feedback signal;

a current command calculator to calculate the d-axis current command and the preliminary q-axis current command, the adapted q-axis inductance from the q-axis estimator and the d-axis flux feedback from the voltage based flux model inputted into the current command calculator;

at least one control logic for comparing the preliminary q-axis current command and the torque producing current limit;

at least one control logic for limiting a q-axis current command sent to the q-axis current regulator such that the q-axis current command does not substantially exceed the torque producing current limit; and at least one control logic for sending the d-axis current command to the d-axis current regulator.

19. The wind power plant of claim 18, wherein the controller includes at least one control logic for selecting a minimum value of the net commanded flux magnitude and a net machine flux feedback from the voltage based flux model and sends the minimum value to a pullout limit calculator.

20. The wind power plant of claim 19, wherein the pullout limit calculator receives the adapted q-axis inductance from the q-axis machine inductance estimator, and wherein the pullout limit calculator divides one of the net commanded flux magnitude and the machine flux feedback by the adapted q-axis inductance to calculate the torque producing current limit.

* * * * *